J. SIMON.
TESTING PLUG FOR PIPE SYSTEMS.
APPLICATION FILED APR. 16, 1908.
910,966.
Patented Jan. 26, 1909.
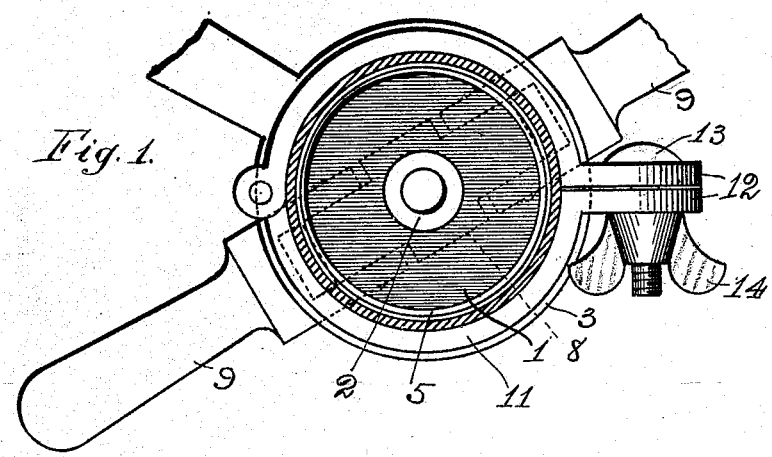
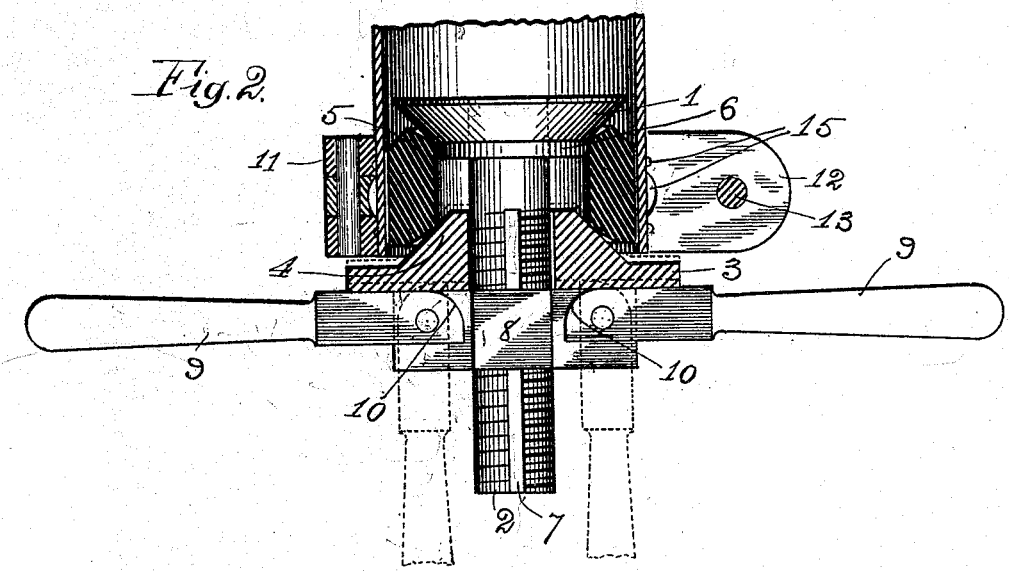
Witnesses:
E. L. Mook
A W Newcomb
Inventor:
Joseph Simon
By Rudolph Wm. Lotz Atty.

UNITED STATES PATENT OFFICE.

JOSEPH SIMON, OF CHICAGO, ILLINOIS.

TESTING-PLUG FOR PIPE SYSTEMS.

No. 910,966.      Specification of Letters Patent.      Patented Jan. 26, 1909.

Application filed April 16, 1908. Serial No. 427,484.

*To all whom it may concern:*

Be it known that I, JOSEPH SIMON, citizen of the United States, residing at Chicago, in the county of Cook and State of Illinois, have invented certain new and useful Improvements in Testing-Plugs for Pipe Systems; and I do hereby declare the following to be a full, clear, and exact description of the invention, such as will enable others skilled in the art to which it appertains to make and use the same.

This invention relates to a novel construction in a plug for pipe systems, such for example as drainage systems for buildings, the object being to provide a simple and efficient device of this character which is easily and quickly applied and effectually seals the system and maintains the same sealed while under pressure, and consists in the features of construction and combinations of parts hereinafter fully described and claimed.

In the accompanying drawings illustrating this invention: Figure —1— is a bottom plan view of a testing plug constructed in accordance with my invention, the same being shown applied to lead pipe, the latter being indicated in section. Fig. —2— is a central vertical section of the device, partly in elevation.

My said device comprises a plate 1 which is beveled on its peripheral portion and is provided with a central hollow externally threaded shank 2 passing loosely through the central opening in the plate 3. The latter is provided with a central tapered projection 4 between which and the tapered portion of the plate 1 the expansible rubber gasket or ring 5 is confined, the latter being maintained centered by means of the cylindrical portion 6 of the plate 1 which snugly fits said ring. The said shank 2 is provided with a longitudinal groove or key-way 7 in which a suitable projection of the plate 3 is received to hold the latter against rotation relatively to said plate 1 in a well known manner, such projection or key being omitted from illustration. The said shank 2 receives the nut 8 by means of which the plates 1 and 3 are moved toward each other against the action of the ring or gasket 5 to peripherally expand the latter, said nut being adapted to be turned by means of the forked levers 9 pivotally secured thereto. The free ends of the arms of the forks of said levers are turned eccentric to the pivot thereof as shown at 10 and are adapted when turned to the position shown in dotted lines in Fig. —1— to force said plate 3 toward the plate 1 and away from said nut 8. The said ring or gasket 5 is beveled on its upper and lower corners, said beveled portions coacting with the tapered surfaces of the plate 1 and projection 4 to expand said ring as said plates 1 and 3 approach each other.

The device is made in various sizes to apply to different sizes of pipe, the diameter of the gasket or ring 5 being slightly less than the inner diameter of the pipe to be plugged so that it may be easily inserted in the latter. After each insertion said ring 5 is expanded by forcing said plates 1 and 3 toward each other, this being accomplished either by turning the nut 8 until the desired degree of expansion is attained, or partly by turning said nut and then turning the levers 9 to throw the eccentrics 10 into engagement with the plate 3.

If a lead pipe is to be plugged it is necessary primarily to confine the same to prevent stretching or fracture thereof, and to this end I provide a split collar 11 consisting of two semicylindrical sections hinged together at one end and provided at their other ends with flanges 12 through which the bolt 13 passes, the latter being equipped with a thumb-nut 14 by means of which the said collar 11 is clamped on the pipe. Lead pipe being very smooth does not allow of the same grip or friction of the ring or gasket 5 thereon as the rough cast-iron pipe usually employed by plumbers, and in order to insure the plug against being blown out, I provide the collar 11 with one or more annular grooves 15 on its inner face into which the lead pipe is expanded by the pressure of the ring or gasket 5, the latter thus providing for itself a sufficiently strong hold on the pipe to prevent its being blown out. To the outer end of the hollow shank a pressure gage or a pump may be connected to indicate or apply pressure to the system.

My said device is very simple and efficient.

I claim as my invention:

A device of the kind specified comprising two opposed plates, central tapered projections on each of said plates opposing each other, an expansion member of resilient material seating on the beveled faces of said projections and adapted to be expanded against the inner face of the pipe to be plugged as said plates are moved toward each other, a central threaded projection on one of the said plates passing loosely through a central opening in the other thereof, there being a longitudinal groove in said projection, a projection on the wall of the opening through which said threaded projection passes entering said groove to hold said plates against relative rotation, a nut on said threaded projection, and levers pivotally secured to said nut and equipped at their ends with surfaces disposed eccentrically to said pivots and adapted to bear on the last-named plate to force the same toward the other when said levers are turned in one direction.

In testimony whereof I have signed my name in the presence of two subscribing witnesses.

JOSEPH SIMON.

Witnesses:
    RUDOLPH WM. LOTZ,
    E. L. MOORE.